United States Patent

Mair et al.

(10) Patent No.: US 9,182,033 B2
(45) Date of Patent: Nov. 10, 2015

(54) METHOD FOR INITIALIZING THE MASS OF A MOTOR VEHICLE

(71) Applicant: ZF Friedrichshafen AG, Friedrichshafen (DE)

(72) Inventors: Roland Mair, Tettnang (DE); Florian Schneider, Lindenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 9 days.

(21) Appl. No.: 14/045,027

(22) Filed: Oct. 3, 2013

(65) Prior Publication Data

US 2014/0121912 A1    May 1, 2014

(30) Foreign Application Priority Data

Oct. 29, 2012  (DE) .................... 10 2012 219 699

(51) Int. Cl.
  *F16H 59/52*  (2006.01)
  *F02D 23/00*  (2006.01)
  *G06Q 50/22*  (2012.01)

(52) U.S. Cl.
  CPC .................... *F16H 59/52* (2013.01)

(58) Field of Classification Search
  CPC .......... F16H 9/52; F16H 59/52; G01G 19/12; G01G 19/08; G01G 23/3742; F02D 23/00; F02D 41/062; B60K 41/004; G08G 1/0967; G08G 1/205; G08G 1/052; G08G 1/207; G06Q 50/10; G06Q 50/22; B60P 1/5457; G05D 1/0244

USPC .................. 701/51, 65, 124, 472; 60/605.1; 340/440, 531, 905; 177/136; 702/184
See application file for complete search history.

(56) References Cited

U.S. PATENT DOCUMENTS

| | | | |
|---|---|---|---|
| 5,703,776 A * | 12/1997 | Soung .............................. | 701/65 |
| 5,929,388 A * | 7/1999 | Uehara et al. .................. | 177/136 |
| 6,459,367 B1* | 10/2002 | Green et al. .................... | 340/440 |
| 7,193,512 B1* | 3/2007 | Coulthard ...................... | 340/531 |
| 8,527,163 B2 | 9/2013 | Staudinger et al. | |
| 2004/0172218 A1* | 9/2004 | Miyazaki et al. ............. | 702/184 |
| 2005/0131645 A1* | 6/2005 | Panopoulos ................... | 701/214 |
| 2012/0209503 A1* | 8/2012 | Wurthner et al. ............. | 701/124 |
| 2012/0234004 A1* | 9/2012 | Stoffels et al. ................ | 60/605.1 |
| 2014/0009308 A1* | 1/2014 | Abuelsaad et al. ........... | 340/905 |

FOREIGN PATENT DOCUMENTS

| | | |
|---|---|---|
| DE | 692 19 569 T2 | 12/1997 |
| DE | 10 2007 015 536 A1 | 10/2008 |
| DE | 10 2009 002 387 A1 | 10/2010 |
| DE | 10 2009 046 344 A1 | 5/2011 |

* cited by examiner

Primary Examiner — Tuan C. To
Assistant Examiner — Yuri Kan
(74) Attorney, Agent, or Firm — Davis & Bujold, P.L.L.C.; Michael J. Bujold

(57) ABSTRACT

A method of initializing the mass of a motor vehicle, in particular when the motor vehicle is re-started or when it is at rest, for the control of a starting process of the motor vehicle. From measured and/or calculated operating parameters of the motor vehicle, an operating situation of the motor vehicle is determined and, on the basis of the operating situation determined and as a function of operating situation dependent loading and/or unloading patterns, the mass of the motor vehicle is initialized.

15 Claims, 1 Drawing Sheet

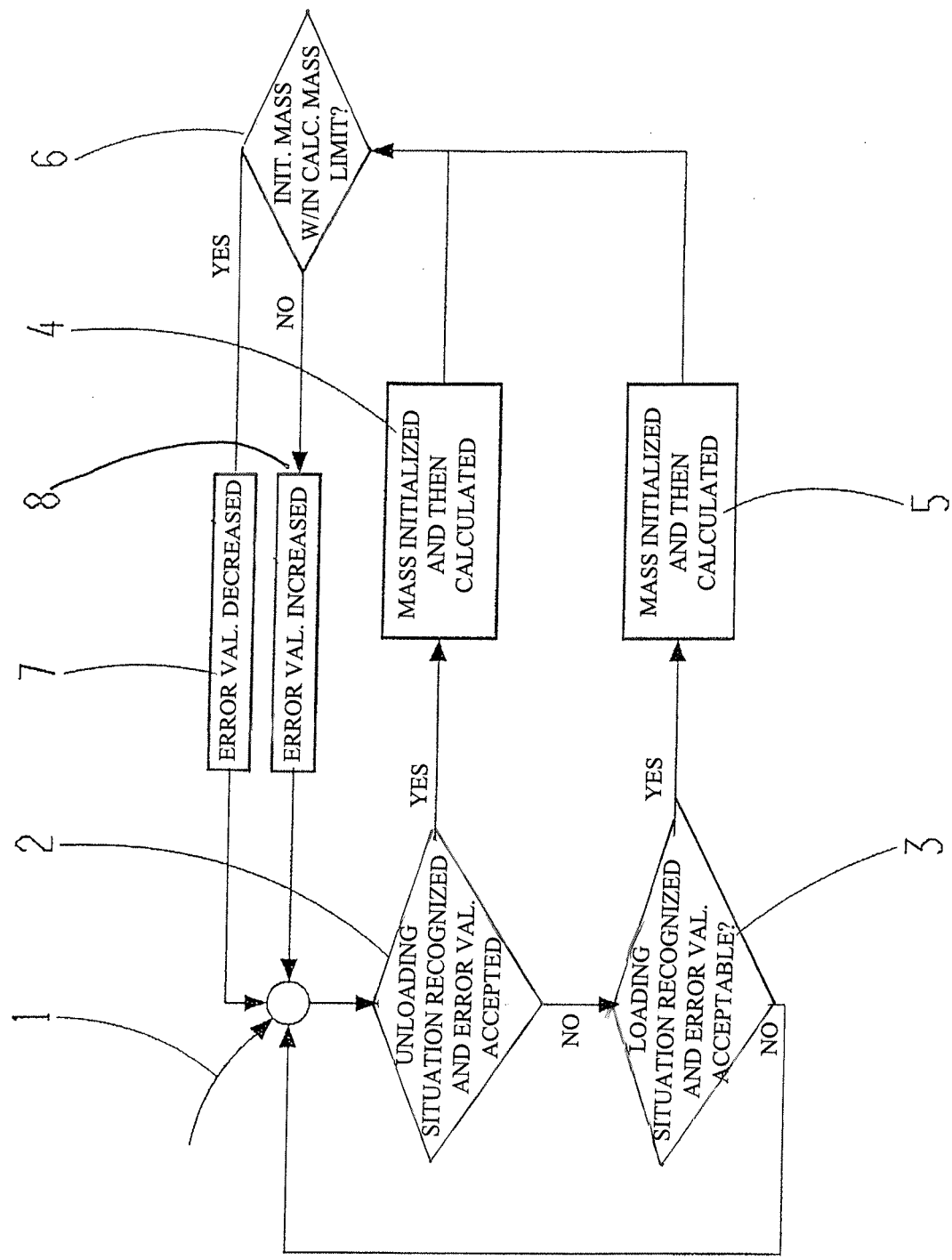

METHOD FOR INITIALIZING THE MASS OF A MOTOR VEHICLE

This application claims priority from German patent application serial no. 10 2012 219 699.4 filed Oct. 29, 2012.

FIELD OF THE INVENTION

The invention concerns a method for initializing the mass of a motor vehicle. Furthermore, the invention concerns a control device for implementing the method.

BACKGROUND OF THE INVENTION

For the operation of automated or automatic change-speed transmissions in motor vehicles, in particular commercial vehicles, it is important to know the mass of the motor vehicle. Depending on the mass of the motor vehicle this enables shifting operations and starting processes to be carried out in a controlled or regulated manner.

From DE 10 2009 002 387 A1 it is known for a transmission control unit of a transmission to continually calculate the current mass of a motor vehicle during its operation, i.e. while driving, in particular with regard to topographical data concerning a current position of the motor vehicle. Such a calculation of the mass is only possible during driving operation, so that directly after a re-start of the motor vehicle or when the motor vehicle is at rest no calculation and thus no initialization of the mass of the motor vehicle is accordingly possible.

However, in the case of commercial vehicles such as semi-trailers, articulated vehicles or vehicles used on building sites, the mass can vary substantially due to loading and unloading operations at rest. To take account of such mass changes of the motor vehicle at rest, it is already known to estimate the mass of the motor vehicle when it is re-started or even at rest, and to update it so as to be able to better control or regulate a subsequent starting process on the basis of the initialized mass of the motor vehicle.

From DE 10 2009 046 344 A1 and DE 10 2007 015 536 A1 respective methods are known for initializing the mass of a motor vehicle. In each case this prior art relates to mechanisms for estimating the mass of the motor vehicle.

The methods known from the prior art for initializing the mass of a motor vehicle have the disadvantage that they carry out an initialization of the mass of the motor vehicle even if, while the motor vehicle is at rest, its mass has not changed because no loading or unloading processes have taken place. Thus, the mass of the motor vehicle estimated during initialization can differ substantially from the actual mass of the motor vehicle.

SUMMARY OF THE INVENTION

Starting from there the purpose of the present invention is to provide a new type of method for initializing the mass of a motor vehicle.

According to the invention, from measured and/or calculated operating parameters of the motor vehicle an operating situation of the motor vehicle is determined, whereby on the basis of the operating situation determined and as a function of operating situation dependent loading patterns and/or unloading patterns the mass of the motor vehicle is initialized.

The invention proposes that from operating parameters of the motor vehicle an operating situation is determined, the operating situation of the motor vehicle also giving an indication of whether a loading or unloading process of the motor vehicle and hence a change of its mass while at rest is probable. Depending on the operating situation determined and using an operating situation dependent loading pattern and/or unloading pattern, the mass of the motor vehicle is initialized.

Thus, the invention is based on the idea of detecting defined operating situations which typically involve a loading or unloading process of the motor vehicle. Accordingly, depending on the operating situation the probability of a mass change is determined and depending on the individual loading and/or unloading patterns for the operating situation concerned, the mass of the motor vehicle is estimated.

In an advantageous further development the mass of the motor vehicle is only initialized for the operating situation determined at the time, if an operating situation dependent error counter value is smaller than a limit value. According to this further development of the invention, for a recognized operating situation the mass of the motor vehicle is only estimated when the operating situation dependent error counter value is smaller than the corresponding limit value. This further development of the invention is based on the recognition that if, for a defined operating situation, the mass of the motor vehicle has been incorrectly initialized several times, then no further mass initialization should thereafter take place for that operating situation.

In a further advantageous further development, following the initialization of the mass of the motor vehicle, during or after the starting process the mass of the motor vehicle is calculated and the initialized mass of the motor vehicle is compared with its calculated mass in order to determine whether the initialization of the mass of the motor vehicle lies within an admissible tolerance band. If the initialization of the motor vehicle's mass lies within the admissible tolerance band, the operating situation dependent error counter value is reduced by an increment. If the initialization of the motor vehicle's mass lies outside the admissible tolerance band, the operating situation dependent error counter value is increased by an increment. In a simple manner, this comparison of the motor vehicle mass estimated by the initialization with the motor vehicle mass calculated after or during the starting process, enables the operating situation dependent error counter value to be updated so that, depending on the precision with which the mass has been estimated, subsequent initializations for defined operating situations can be permitted or blocked.

Preferably, when the initialization of the motor vehicle's mass lies within the admissible tolerance band, on the basis of the comparison between the initialized mass of the motor vehicle and its calculated mass the relevant operating situation dependent loading and/or unloading patterns are adapted. By adapting the operating situation dependent loading and/or unloading patterns the mass estimation during the initialization of the motor vehicle's mass can be further improved.

BRIEF DESCRIPTION OF THE DRAWING

Example embodiments of the invention, to which it is not limited, are explained in more detail with reference to a sole drawing. The sole drawing shows a signal-flow diagram of the method for initializing the mass of a motor vehicle.

DETAILED DESCRIPTION OF THE PREFERRED EMBODIMENTS

The present invention concerns a method for initializing the mass of a motor vehicle, in particular a commercial vehicle, in order, during a re-start of the motor vehicle or a starting process of the motor vehicle following a period when it has been at rest, to be able to control or regulate the starting process precisely as a function of the mass of the motor vehicle estimated by the initialization.

In the context of the invention, to initialize the mass of a motor vehicle an operating situation of the motor vehicle is determined from operating parameters of the motor vehicle measured and/or calculated before the re-starting of the motor vehicle or while it is at rest. On the basis of this operating situation and as a function of operating situation dependent loading and/or unloading patterns stored for the operating situation, the mass of the motor vehicle is initialized, namely estimated. Then, with reference to the operating parameters of the motor vehicle and to its determined operating situation, it is determined whether a mass change brought about by a loading or an unloading process is probable. If a loading or unloading process is probable, the mass is initialized as a function of the operating situation dependent loading and/or unloading patterns.

The invention can be applied with many different commercial vehicles, such as semi-trailers, articulated trucks, vehicles used on building sites, container transporters or garbage-collection trucks.

For all these commercial vehicle types, by virtue of operating parameters various operating situations can be defined and for the various operating situations, operating situation dependent loading and/or unloading patterns can be stored.

For example, in the case of a commercial vehicle in the form of a semi-trailer the operating situation of unhitching the trailer can be recognized if the following operating parameters are cumulatively fulfilled:

a) the motor vehicle stops; b) the motor vehicle remains at rest for a relatively short time; c) the current mass of the motor vehicle is greater than its unladen mass; d) the level of the tractor vehicle is raised, this raising of the level being detectable by measurement with the help of an inclination sensor; e) the vehicle moves forward and the distance covered during this corresponds approximately to the length of the tractor vehicle; f) if necessary the motor vehicle stops again for a short time in order to re-adjust the driving level.

If these operating parameters are cumulatively fulfilled, then an operating situation of unhitching is recognized and as a function of a stored unloading pattern the mass of the vehicle is initialized, namely to the mass of the tractor vehicle.

With a commercial vehicle in the form of a semi-trailer the operating situation of hitching up can be recognized if the following operating parameters cumulatively occur:

a) the motor vehicle drives slowly in reverse, in particular more slowly than walking pace, at least over a distance that corresponds approximately to the length of the tractor of the semi-trailer; b) the current mass of the motor vehicle corresponds approximately to its unladen mass; c) the motor vehicle remains at rest; d) if necessary the level of the tractor vehicle is first raised and then lowered again, this being able to be detected by evaluating the measurement signals of an inclination sensor; e) then the vehicle moves forward at a low speed.

When these operating conditions are cumulatively fulfilled, the operating situation of hitching up is recognized and during the course of initialization the mass is estimated, the mass of the tractor vehicle being increased at least by the unladen mass of a trailer.

In the case of a vehicle in the form of an articulated truck the operating situation of uncoupling a trailer can be recognized when the following operating parameters are cumulatively fulfilled:

a) the vehicle stops and remains at rest for a short time; b) that time must be long enough for a trailer clamp on the tractor vehicle to be opened and for the compressed air connections and electrical connections on the trailer to be taken apart. For this, an empirically determined time interval can be stored in the control system; c) then, the vehicle drives forward carefully for a relatively short distance.

If these operating parameters are cumulatively fulfilled, the operating situation of uncoupling a trailer of the articulated truck is deduced and as a function of an unloading pattern stored for that operating situation the mass of the vehicle is estimated for the initialization.

With an articulated truck the operating situation of coupling a trailer can be recognized when the following operating parameters are cumulatively fulfilled:

a) the vehicle stops, then drives slowly in reverse over a defined distance, and is then brought to rest; b) the vehicle remains at rest for a defined time that corresponds at least to the time needed in order to close the trailer clamp and to connect the pneumatic and electrical connections to the trailer. That time is stored in the control system after having been determined empirically in advance.

In such a case the coupling of the trailer can be inferred and for the operating situation of coupling the mass is initialized on the basis of a stored loading pattern.

It should be pointed out that the above-described operating situations of unhitching and hitching up a semi-trailer and uncoupling and coupling the trailer of an articulated truck are presented only as examples. It is incumbent upon a person with the relevant knowledge, in the case of other operating situations when a loading or unloading process is probable, to decide upon operating parameters for the detection of the operating situation concerned.

Such operating situations can for example include, for a semi-trailer, the recognition of loading or unloading by means of a fork-lift, for a semi-trailer the recognition of loading or unloading by means of a crane, for a building-site vehicle the recognition of unloading by dumping, for a building-site vehicle the recognition of loading by means of a bagger or the recognition of loading by way of a silo, for a container transporter the recognition of the removal or deposition of a container, and for a garbage truck the recognition of a garbage collection process or a garbage unloading process.

The determination of an operating situation of the motor vehicle on the basis of operating parameters can also have recourse to navigation data or GPS data. For example, if a vehicle stops for a longer time ahead of a level crossing, a toll-gate or a ferry-pier, on the basis of navigation data it can be concluded that a loading or unloading process is unlikely, so that re-initialization of the vehicle's mass is not carried out. Furthermore, typical navigation data concerning loading and unloading points can be stored in the control system so that if the motor vehicle remains at rest at a typical loading or unloading location, an initialization of the vehicle's mass is permitted.

Moreover, the determination of an operating situation of the motor vehicle can also have recourse to time data and date data. Many vehicles are operated in ever-repeated, similar operating cycles, so that on the basis of these operating cycles the probability of a loading or unloading process and hence that of a defined operating situation of the motor vehicle can be inferred.

As a further operating parameter, when determining an operating situation a door-switch signal of a driver's cabin can be evaluated. Typically, during a loading or unloading process freight documentation has to be exchanged, so that in connection with a loading or unloading process a driver has to leave the driver's cabin of the vehicle.

The signal provided by a door switch can accordingly be taken into account as a further operating parameter for determining the operating situation of the motor vehicle.

When, following the recognition of an operating situation for which a mass change of the motor vehicle is probable, an initialization of the mass of the motor vehicle has been carried out, according to the invention on completion of the mass initialization the mass of the motor vehicle during or after a starting process is calculated and the initialized mass of the motor vehicle is then compared with its calculated mass, in order to determine whether the initialized mass of the motor vehicle lies within an admissible tolerance band around the calculated mass, or is outside that tolerance band.

When the initialized mass of the motor vehicle is within the admissible tolerance band around the calculated mass, then on the basis of the deviation between the initialized mass and the calculated mass of the motor vehicle the respective operating situation dependent loading and/or unloading pattern can be adapted in order, during subsequent initializations for the same operating situations, to minimize the deviation between the initialized mass and the subsequently calculated mass.

Preferably, when the initialized mass of the motor vehicle lies within the admissible tolerance band, an operating situation dependent error counter value is decreased or reduced by an increment, whereas in contrast, if the initialized mass of the motor vehicle is outside the admissible tolerance band, the operating situation dependent error counter value is increased by an increment.

The mass of the motor vehicle is preferably only initialized if, when an operating situation is recognized for which a mass change of the motor vehicle is probable, the operating situation dependent error counter value concerned is smaller than a limit value.

Thus, if for a recognized operating situation an initialization of the vehicle's mass that lies outside the tolerance band has been carried out too frequently, then when the same operating situation is recognized again an initialization of the vehicle's mass for that operating situation is subsequently suppressed.

If, as a result of incrementation, the operating situation dependent error counter value exceeds a first limit value, the particular operating situation dependent loading and/or unloading pattern that was previously active is deactivated, whereas in contrast, if the operating situation dependent error counter value at the time is lower than a second limit value, the particular operating situation dependent loading and/or unloading pattern which was previously inactive is activated.

These two limit values may coincide or, to provide a hysteresis between the activation and deactivation of the loading and/or unloading pattern concerned, they may also be different from one another.

Below, further details of the invention are described with reference to the block flow chart or signal flow diagram shown in FIG. 1, wherein when a condition 1 is fulfilled the method according to the invention is commenced.

In blocks 2 and 3 it is checked, respectively, whether any one of several operating situations defined by corresponding operating parameters is fulfilled, and whether in addition the operating situation dependent error counter value at the time is smaller than a limit value.

Thus, for example, in the case of a semi-trailer it can be checked in block 2 whether the operating parameters stored for the operating situation of unhitching are fulfilled, and whether in addition and at the same time the error counter value stored for the operating situation of unhitching is smaller than a limit value.

If these two conditions are cumulatively fulfilled, then the system branches off from block 2 to block 4. In block 4, for the determined operating situation of unhitching the initialization of the vehicle's mass takes place.

If one of the conditions of block 2 is not fulfilled, namely the operating situation stored for block 2 is not fulfilled and/or the operating situation dependent error counter value is larger than the limit value, then starting from block 2 the system does not branch off to block 4.

In block 3, for a semi-trailer it can be checked whether the operating situation of hitching up can be inferred and whether at the same time the individual error counter value for hitching up is smaller than a corresponding limit value.

If both conditions are fulfilled simultaneously it follows that the operating situation of hitching up exists and that the corresponding error counter value is smaller than a limit value, so starting from block 3 the system branches off to block 5 and in block 5, on the basis of the loading pattern stored for the operating situation of hitching up, the initialization of the vehicle's mass takes place.

On the other hand, if in block 3 it is found that the operating situation of hitching up does not exist and/or that the corresponding error counter value is larger than the respective limit value, then the system does not branch from block 3 to block 5.

After the mass of the motor vehicle has been initialized in block 4 or block 5, the mass of the motor vehicle is calculated then or after a starting process and in block 6 it is checked whether the initialized mass of the motor vehicle agrees with its calculated mass or whether the initialized mass of the motor vehicle is within an admissible tolerance band around its calculated mass.

If so, i.e. if the mass of the motor vehicle has been initialized with sufficient accuracy, then starting from block 6 the system moves on to block 7 and in block 7 an error counter value stored for the operating situation concerned is decreased or reduced by an increment.

In contrast, if in block 6 it is found that the initialized mass of the motor vehicle lies outside the admissible tolerance band around the calculated mass of the motor vehicle, then starting from block 6 the system branches off to block 8 and the error counter value for the operating situation concerned is raised or increased by an increment.

Thus, in the sense of the present invention, depending on operating parameters it can be deduced that a particular operating situation exists in which a change of the vehicle's mass while the motor vehicle is at rest is probable.

If it is concluded that such an operating situation exists, namely one in which a change of the vehicle's mass as the result of loading or unloading is probable, then on the basis of an operating situation dependent loading and/or unloading pattern the mass of the motor vehicle is initialized.

After the initialization, with reference to a calculated vehicle mass it is then checked whether the initialization of the vehicle's mass was sufficiently accurate. If so, then preferably an adaptation and reduction of an operating situation dependent error counter value takes place. On the other hand, if the initialization of the vehicle's mass was not sufficiently accurate, then the operating situation dependent error counter value is increased so that, if the error counter value exceeds a limit value, further initializations of the vehicle's mass for the operating situation concerned are suppressed.

The control device according to the invention comprises means for carrying out the method. Those means include in particular a processor, a memory and data interfaces. By way of the data interfaces measured and/or calculated operating parameters can be received from sensors or other control devices. The processor serves to evaluate the operating parameters, to determine an operating situation and to estimate the operating situation dependent mass. In addition the processor serves subsequently to calculate the mass, to compare the initialized mass with the calculated mass and to implement the above-mentioned measures on the basis of that comparison. The memory serves to store the operating parameters, the operating situations, the operating situation dependent loading and unloading patterns and the error counter values.

INDEXES

1 Condition
2 Block
3 Block
4 Block
5 Block
6 Block
7 Block
8 Block

The invention claimed is:

1. A method of initializing a mass of an motor vehicle, either before the motor vehicle is started or when the motor vehicle is at rest, for control of a starting process of the motor vehicle, the motor vehicle comprising a timepiece, a door switch, and at least one of a navigation unit and a GPS unit, the method comprising the steps of:
   determining, with a control device of the motor vehicle, an operating situation of the motor vehicle from at least one of measured and calculated operating parameters of the motor vehicle which are measured by a plurality of operating parameter measurement devices;
   specifying at least one of time and date data via the timepiece, door switch signals via the door switch, and current navigation data via at least one of the navigation unit and GPS unit; and
   at least one of the steps of:
      considering, with the control device, the current navigation data in relation to typical navigation data that correspond to typical loading and unloading points when determining the operating situation of the motor vehicle;
      considering, with the control device, the time and the date data in relation to operating cycles when determining the operating situation of the motor vehicle; and
      evaluating, with the control device, the door-switch signals when determining the operating situation of the motor vehicle;
   initializing, with the control device, the mass of the motor vehicle on a basis of the determined operating situation and as a function of at least one of operating situation dependent loading and unloading patterns;
   permitting starting of an engine of the motor vehicle under a first determined operating situation; and
   preventing starting of the engine of the motor vehicle under a second determined operating situation.

2. The method according to claim 1, further comprising the step of initializing, with the control device, the mass of the motor vehicle on the basis of the determined operating situation only if an error counter value, for the determined operating situation, is smaller than a limit value.

3. The method according to claim 1, further comprising the steps of calculating, with the control device, the mass of the motor vehicle, following the initialization of the mass of the motor vehicle, either during or after the starting process, and comparing the initialized mass of the motor vehicle with the calculated mass of the motor vehicle to determine whether the initialization of the mass of the motor vehicle lies either within or outside an admissible tolerance band around the calculated mass.

4. The method according to claim 3, further comprising the step of adopting, with the control device, at least one of the operating situation dependent loading pattern and the operating situation dependent unloading pattern, if the initialization of the mass of the motor vehicle is within the admissible tolerance band on the basis of the comparison between the initialized mass of the motor vehicle and the calculated mass of the motor vehicle.

5. The method according to claim 3, further comprising the step of reducing an error counter value, which corresponds to the determined operating situation, by an increment, if the initialized mass of the motor vehicle lies within the admissible tolerance band.

6. The method according to claim 5, further comprising the step of activating a respective, previously inactive one of the operating situation dependent loading and unloading patterns, if the error counter value is smaller than a first limit value.

7. The method according to claim 3, further comprising the step of increasing the error counter value by an increment, if the initialized mass of the motor vehicle lies outside the admissible tolerance band.

8. The method according to claim 7, further comprising the step of deactivating a respective, previously active one of the operating situation dependent loading and unloading patterns, if the error counter value exceeds a second limit value.

9. A method of estimating an operating situation of a transmission of a motor vehicle comprising a transmission control device, a processor, a memory and data interfaces, the method comprising the steps of:
   measuring and calculating operating parameters from at least one of motion, speed and direct measurement devices, a time measurement device, a distance measurement device and a level sensor;
   receiving and evaluating the operating parameters by the processor;
   determining an operating situation, and estimating an operating situation dependent mass of the motor vehicle based on the determined operating situation by the processor;
   communicating with the memory which stores the operating parameters, the operating situations, operating situation dependent loading and unloading patterns,
   the transmission control device controlling a starting process of the motor vehicle by the steps of:
      estimating the operating situation dependent mass of the motor vehicle, either before the motor vehicle is started or when the motor vehicle is at rest,
      determining, with the processor of the transmission, the operating situation of the motor vehicle from the at least one of the measured and the calculated operating parameters of the motor vehicle,
      estimating the operating situation dependent mass of the motor vehicle on a basis of the determined operating situation of the motor vehicle and as a function of the operating situation dependent loading and unloading patterns;

specifying at least one of time and date data via the time measuring device, door-switch signals via a door switch, and current navigation data via at least one of a navigation unit and a GPS unit; and at least one of the steps of:
considering, with the control device, the current navigation data in relation to typical navigation data that correspond to typical loading and unloading points when determining the operating situation of the motor vehicle;
considering, with the control device, the time and the date data in relation to operating cycles when determining the operating situation of the motor vehicle; and
evaluating, with the control device, the door-switch signals when determining the operating situation of the motor vehicle;

wherein the step of controlling a starting process of the motor vehicle comprises one of either starting or preventing the starting of an engine of the motor vehicle on the basis of the determined operating situation and as the function of at least one of operating situation dependent loading and unloading patterns.

10. The method according to claim 1, further comprising the step of operating one of an automated and an automatic change-speed transmission of the motor vehicle based on the initialized mass.

11. The method according to claim 1, further comprising the step of initializing the mass of the motor vehicle after unhitching of a trailer from the motor vehicle, and recognizing unhitching of the trailer from the motor vehicle when each of the following operating parameters cumulatively occur:
a) stopping the motor vehicle;
b) maintaining the motor vehicle at rest for at least a relatively short duration of time;
c) the current mass of the motor vehicle being greater than an unladen mass of the motor vehicle;
d) detecting, via an inclination sensor, that a level of the motor vehicle was raised; and
e) moving the vehicle forward by at least a distance which corresponds approximately to a length of the motor vehicle.

12. The method according to claim 1, further comprising the step of initializing the mass of the motor vehicle after unhitching of a trailer from the motor vehicle, and recognizing unhitching of the trailer from the motor vehicle when each of the following operating parameters cumulatively occur:
a) driving the motor vehicle relatively slowly in reverse at least over a distance that corresponds approximately to a length of the motor vehicle;
b) a current mass of the motor vehicle corresponds approximately to an unladen mass of the motor vehicle;
c) maintaining the motor vehicle at rest;
d) detecting, via an inclination sensor, that a level of the motor vehicle is raised and then lowered; and
e) then moving the motor vehicle forward at a relative low speed.

13. The method according to claim 1, further comprising the step of initializing the mass of the motor vehicle after unhitching of a trailer from the motor vehicle, and recognizing unhitching of the trailer from the motor vehicle when each of the following operating parameters cumulatively occur:
a) stopping and maintaining the motor vehicle at rest for at least a time period in which the time period is long enough for a trailer clamp on the motor vehicle to be opened and for compressed air connections and electrical connections on the trailer to be disconnected;
b) storing time period, which is determined empirically, in a control system for the motor vehicle; and
c) then driving the motor vehicle forward for a relatively short distance.

14. The method according to claim 1, further comprising the step of initializing the mass of the motor vehicle after hitching of a trailer from the motor vehicle, and recognizing hitching of the trailer from the motor vehicle when each of the following operating parameters cumulatively occur:
a) stopping the motor vehicle and then driving the motor vehicle relatively slowly in reverse over a defined distance;
b) bring the motor vehicle to rest; and
c) maintaining the vehicle at rest for a defined time that corresponds at least to a time required in order to close a trailer clamp and connect pneumatic and electrical connections to the trailer.

15. A method of estimating a mass of a motor vehicle for controlling a starting process with a transmission control system before the motor vehicle starts moving, wherein the motor vehicle comprises a motion measuring device for measuring vehicle motion, and a speed and a direction of the vehicle motion, a time measuring device for measuring time, a distance measuring device for measuring a distance over which the motor vehicle moves, an inclination sensor for measuring a level of the motor vehicle, a trailer clamp for coupling a trailer to the motor vehicle, pneumatic and electrical connections for connecting to the trailer, a timepiece that specifies at least one of time and date data, a door switch which specifies door-switch signals, and a GPS navigation unit specifies current navigation data, the method comprising the steps of:
at least one of measuring and calculating at least one of a motion parameter, a speed parameter, a direction parameter, a time parameter, a distance parameter and a level parameter with at least one of the motion measuring device, the time measuring device, the distance measuring device and the inclination sensor;
receiving, with the transmission control system, at least one of the motion parameter, the speed parameter, the direction parameter, the time parameter, the distance parameter and the level parameter;
determining, with the transmission control system, a vehicle operating situation based on the at least one of the motion parameter, the speed parameter, the direction parameter, the time parameter, the distance parameter and the level parameter;
comparing, with the transmission control system, an operating situation specific error value of an error value counter that corresponds to the determined vehicle operating situation to a limit value that corresponds to the determined vehicle operating situation;
if the operating situation specific error value is lower than the limit value, estimating, with the transmission control system, the mass of the motor vehicle based on an operating situation dependent pattern that corresponds to the determined vehicle operating situation;
controlling the starting process of the motor vehicle as a function of the estimated mass of the motor vehicle;
calculating, with the transmission control system, an actual mass of the motor vehicle after the motor vehicle starts moving, and comparing the estimated mass of the motor vehicle to the actual mass of the motor vehicle;
increasing the operating situation specific error value of the error value counter, if the estimated mass of the motor vehicle is outside a tolerance range of the actual mass of the motor vehicle;

decreasing the operating situation specific error value of the error counter, if the estimated mass of the motor vehicle is within the tolerance range of the actual mass of the motor vehicle; and at least one of the steps of:
- permitting, with the transmission control system, the estimation of the mass of the motor vehicle, if the current navigation data correlates to typical navigation data of typical loading and unloading points;
- permitting, with the transmission control system, the estimation of the mass of the motor vehicle, if the time and the date data correlates to repeated operating cycles; and
- determining, with the transmission control system, the vehicle operating situation based on the door-switch signals in combination with the at least one of the motion parameter, the speed parameter, the direction parameter, the time parameter, the distance parameter and the level parameter.

* * * * *